United States Patent [19]
Shelef

[11] 3,765,028
[45] Oct. 9, 1973

[54] METHOD OF IMPROVING A PROCESS WITH MANY VARIABLES

[75] Inventor: Ginton Shelef, Houston, Tex.

[73] Assignee: Shell Oil Company, Houston, Tex.

[22] Filed: Aug. 10, 1971

[21] Appl. No.: 170,538

[52] U.S. Cl. .............................. 444/1, 235/150.1
[51] Int. Cl. ........................................ G05b 19/00
[58] Field of Search .................................. 444/1

*Primary Examiner*—Eugene G. Botz
*Attorney*—H. L. Denkler et al.

[57] ABSTRACT

A method of improving process performance by detecting the controlled process variable with longest response time and cutting that response time. The response time of all other process variables is detected and appropriate delays are introduced into each control variable so that all process variables reach their final set point at the same time. Any errors in the arrival time of process variables at their final set point are detected and the appropriate delays are modified accordingly.

3 Claims, 17 Drawing Figures

Ginton Shelef
INVENTOR

Ginton Shelef
INVENTOR

BY *John E. Graham*
ATTORNEY

Ginton Shelef
INVENTOR

ATTORNEY

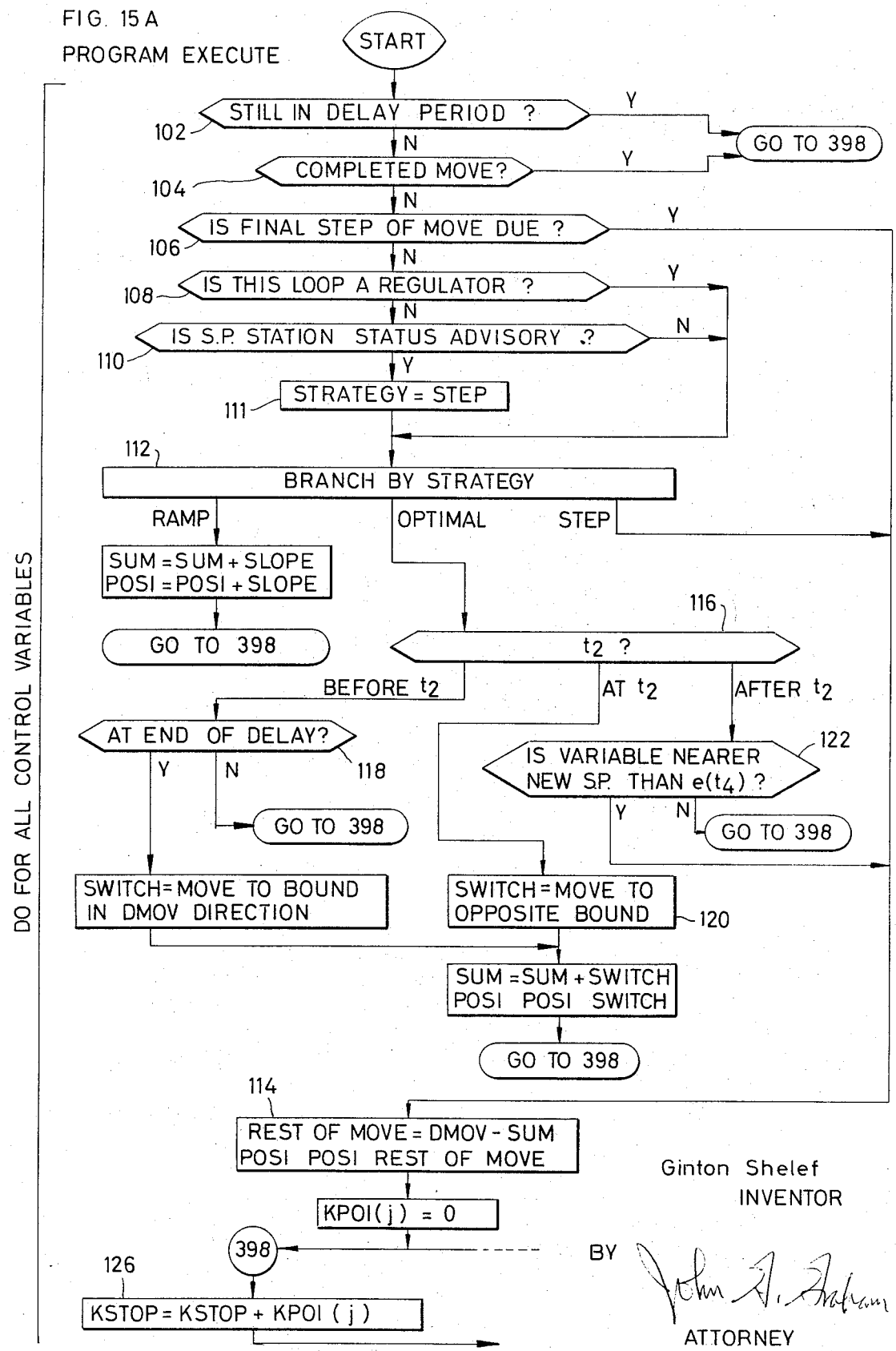

3,765,028

METHOD OF IMPROVING A PROCESS WITH MANY VARIABLES

BACKGROUND OF THE INVENTION

The present invention relates to the control of processes. More particularly, it relates to the control of chemical processes having many control variables.

In the typical operation of a complex process there are many process variables that may be controlled to achieve various objectives, such as to maximize profits. For example, in a petroleum refinery, process variables such as temperatures, pressures, feed rates, reflux rates, etc. are moved to different set points by manipulating appropriate control variables such as heat, blower speeds, valves, etc. It is common to determine the set points of the various control variables by means of classical linear programming techniques with the aid of a digital computer. After a computer run has been made and the individual set points determined, an operator sequentially adjusts each of the control variables so that it conforms with the set points established with the most recent linear programming computer run. Since the conditions in the plant are changing continuously, set points are recalculated periodically, for example once every 60 or 90 minutes.

The weakness with this technique is that the set points are calculated for steady state operation and no information is provided on how the set points should be changed. Furthermore, this technique provides no information about what happens as the variables are moved from one set point to another. Ideally one would like to disturb the operations of the plant as little as possible in changing control set points. However, the old technique supplied no insight into how this might be achieved. All that was possible under the old system was a designation of the length of time over which a set point was to be moved. As a matter of practice all set points were moved over a constant period of, e.g., four minutes merely because the existing control techniques gave no insight into what might be a better procedure. The consequences of this technique is that between the time that the first set point is altered and the time that the plant again reaches a steady state operation after all necessary control variable set points have been adjusted, the plant may have been seriously disturbed and profitable operations disrupted. And since control point adjustments may be made as often as every hour and the adjusting process may take 20 minutes or longer, the plant may not be in optimized profitable operation for as much as one-third of the time. Consequently, the potential savings that may be achieved by optimizing the move from one group of set points to another is very substantial. It is therefore an object of this invention to substantially improve the performance of a process by optimizing the manner in which the control variable set points are moved from one position to another.

Another object of the invention is to minimize time spent on the variable movement.

Finally, it is an object of the invention to decrease plant disturbances during variable movement.

SUMMARY OF THE INVENTION

These and other objects of the invention are achieved by a method comprising the steps of determining the time necessary for each control variable to move from one set point to another, delaying the control variables having faster response times so that all process variables arrive at their final set point at the same time, and decreasing the response time of the slowest variable until it is no slower than the second slowest responding variable.

To better understand the invention it is helpful to have an understanding of the theory standing behind it. To start with, it is necessary to recognize that when a chemical plant is in steady state equilibrium, both the energy input and output and the materials input and output are in balance. However, for various reasons it is necessary to frequently change the operation of the plant from one steady state point to another. And this of course requires a change in the set points of the various control variables. An optimization program using accumulated data (from which steady state material and energy balances are determined) is utilized to prescribe a change in plant variables in order to increase some measure of performance such as profits. The new set of prescribed control variable set values satisfies material and energy balances and hence guarantees a steady state condition.

Figure 1:
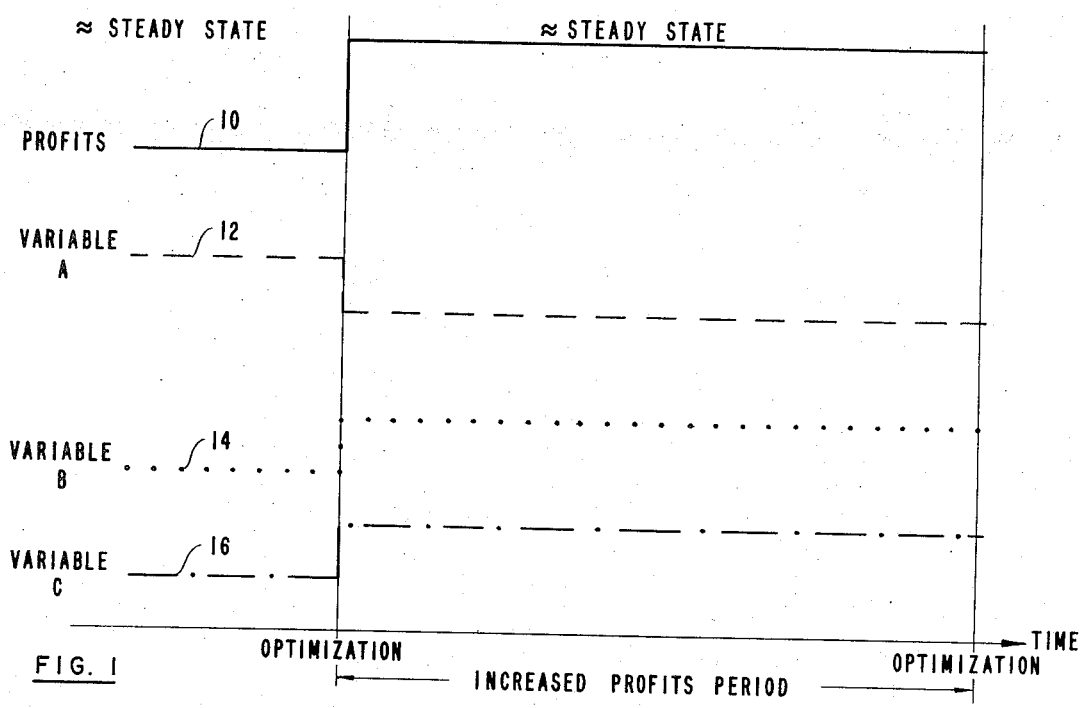
FIG. 1 is a graph showing the ideal instantaneous movement of all process variables and the resultant change in profits.

Naturally, conditions change continuously. Therefore, the optimization program is run periodically. In order to realize the increased profits, the new variable values must be achieved after each optimization. The maximum amount of increased profits will be achieved ideally with instantaneous movement of process variables. This situation is illustrated in FIG. 1 where plant profits is illustrated by curve 10 operating at the lower profit level from time $t_0$ to time $t_1$ at which point a step change in profits to the new higher level occurs. This change in profits is brought about ideally by the step change in the three process variables $a$, $b$, and $c$ represented by lines 12, 14, and 16 that are also changed instantaneously at time $t_1$. In real practice of course there would be many more variables to consider but for the sake of illustration and clarity only three are shown here. Also in a real life situation, process variables cannot be moved instantaneously. Rather, the variable movements are governed by the dynamics of the process. By dynamics is meant the response of a process variable such as temperature to a move in a control variable such as heat supplied as well as the interaction between various process variables.

Figure 2:
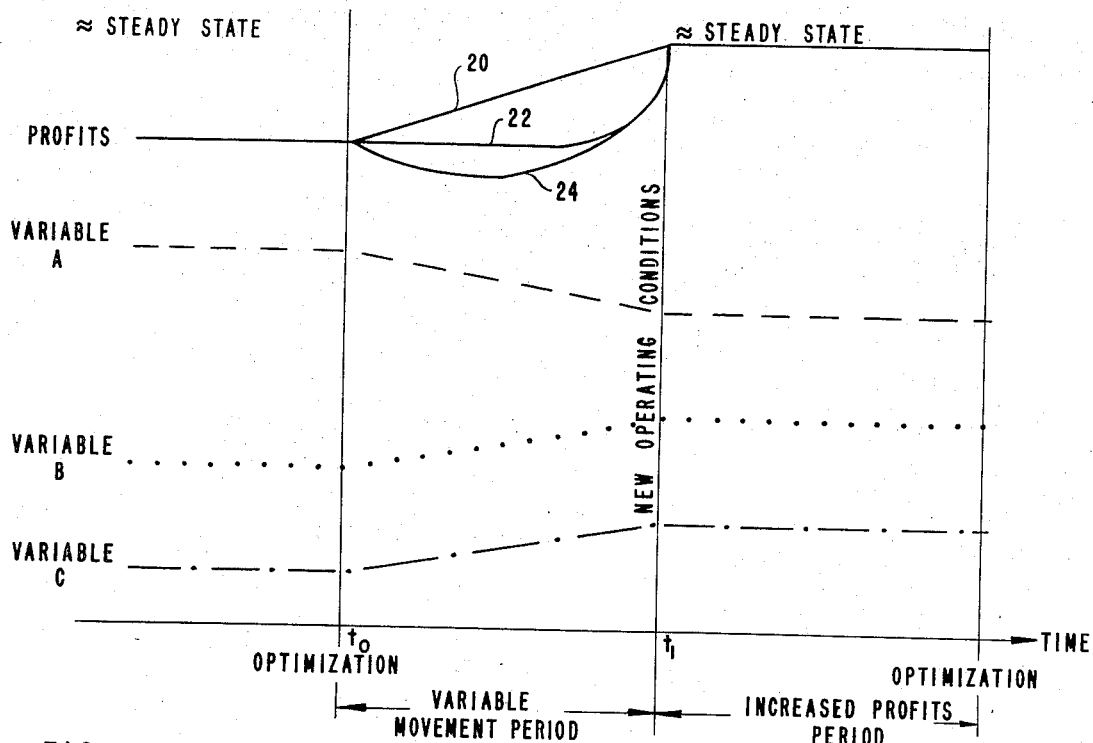
FIG. 2 is a graph showing the effect on profits of process variable movement time.

FIG. 2 shows schematically how an increase in profits due to a change in process variables is reduced by the inability of process variables to move instantaneously. In this case process variables $a$, $b$, and $c$ are moved in a ramp fashion, variable a being decreased, while variables $b$ and $c$ are increased, during the variable movement period between times $t_0$ and $t_1$. All variables are being moved over the same period of time. With this situation the plant will likely be disturbed and the performance of the process, in this case measured by profits during this period, may take from the original level at time $t_0$ to the new level at time $t_1$ are illustrated by curves 20, 22 and 24. Curve 20 represents a near ideal situation where profits increase steadily from the time the initial changes are made until time $t_1$ when the final set points are reached. Curve 22 represents a perhaps more realistic situation in which profits remain the same over most of the period between $t_0$ and $t_1$ but rise rapidly in the latter portion of that period. Finally, FIG. 24 represents perhaps a worse case situation in which profits in fact fall over part of the period and then rapidly rise to the final set point at time $t_1$. The extent of the plant process disturbances determines the curve that profits will take. Thus, the objectives must be to first minimize the time spent in the variable movement and secondly during that movement minimize the amount of plant disturbances and thereby raise the profit curve as quickly as possible.

Figure 3:
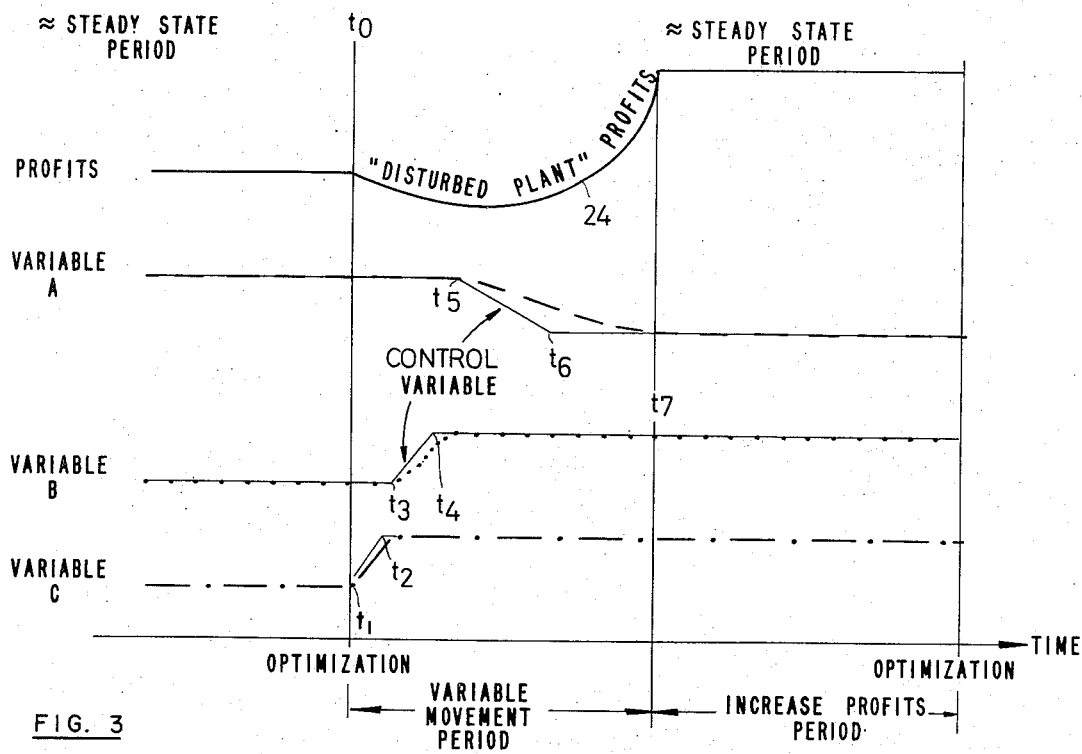
FIG. 3 is a graph showing the effect upon profits by the sequential movement of variables.

Presently, the most typical scheme for moving plant variables is shown in FIG. 3. There variables $a$, $b$, and $c$ are moved sequentially. That is, first control variable $c$ is moved during the period from $t_1$ until $t_2$, consequently, process variable c completes its move at $t_3$. Then control variable b is moved during the period $t_3$ to $t_4$ and finally control variable a is moved during the period $t_5$ to $t_6$. Human operators when not instructed otherwise tend to move the control variables one at a time waiting for the response of each process variable. Unfortunately, this is probably the worst possible scheme for moving the control variables. In the first place it takes the longest period for the movement of process variables. And secondly there is no possibility of not disturbing the energy and material balances. As might be expected, the change in set points of a particular control variable may cause either energy or material to accumulate. Whereas the change in the set point of another control variable may cause either the energy or material to deplete. The result is that if a particular variable causing material to accumulate is moved at the same time as another control variable causing material to deplete, a certain amount of cancellation will occur and the process will be disturbed less than if these variables were moved sequentially. Likewise, if a variable causing material depletion is moved at the same time as a variable causing material accumulation, cancellation will also occur and the process will be disturbed less severely than if the two variables were moved sequentially. But in the scheme illustrated in FIG. 3, the variables are moved sequentially causing maximum process disturbances as well as the longest process variable movement period.

As a result, the parameter measuring process performance, in this case profits as illustrated by curve 24, actually follows a worst case locus as profits decrease between time $t_1$ and $t_7$. If the time between $t_1$ and $t_7$ is in the order of 20 minutes which it may well be, and the set points changed every hour, very considerable improvement is possible.

Figure 4:
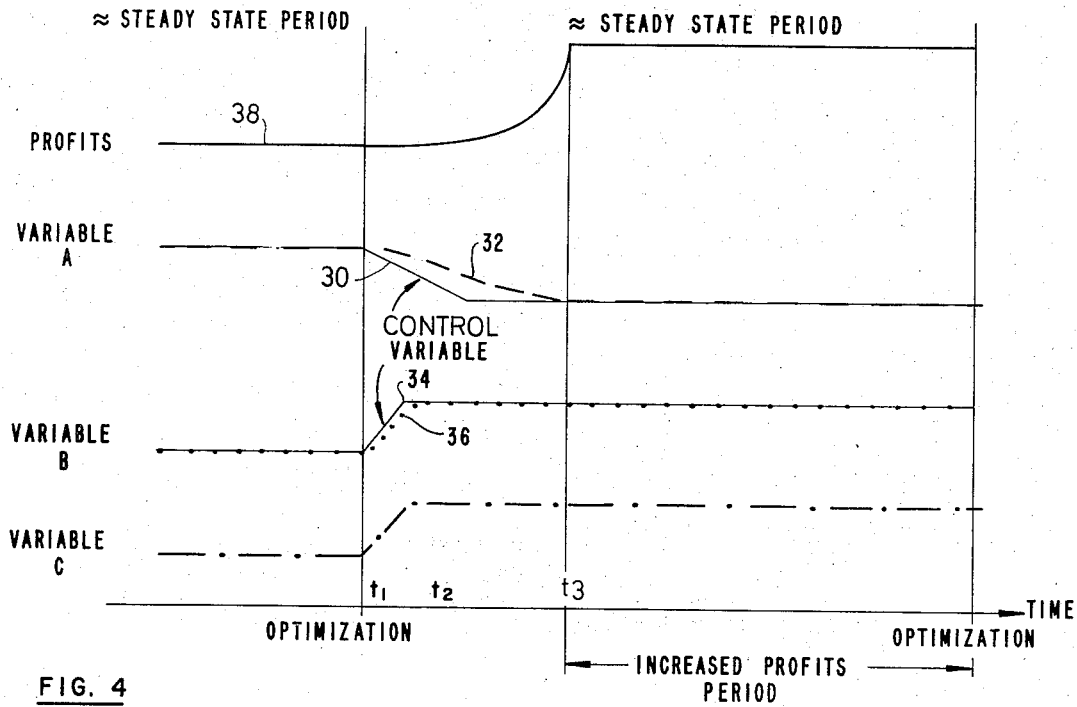
FIG. 4 is a graph showing the effect on profits of the simultaneous control variable movement minimizing the plant disturbances.

FIG. 4 illustrates that profits may be increased somewhat due to some disturbance cancellation if all of the control variable movements are started together. In FIG. 4, the movement of control variables $a$, $b$, and $c$ is started together at time $t_1$. Curve 30 represents the actual movement of control variable $a$ and curve 32 represents the response of the process variable to that movement. Likewise curve 34 represents the actual movement of control variable $b$ and curve 36 represents the process response thereto. In this case the total length of the process variable movement period is determined by curve 32, the longest time taken for the process to respond to a single variable. In FIG. 4, all of the control variables are started together so that whatever disturbance cancellation occurs does so in the early part of the variable movement period, as the quick responding variables b and c reach their final set point. During the period $t_2$ to $t_3$ variable $a$ is the only one moving and profits are depressed. Finally profit curve 38 rises rapidly to its final value in the last small portion of the variable movement period.

Figure 5:
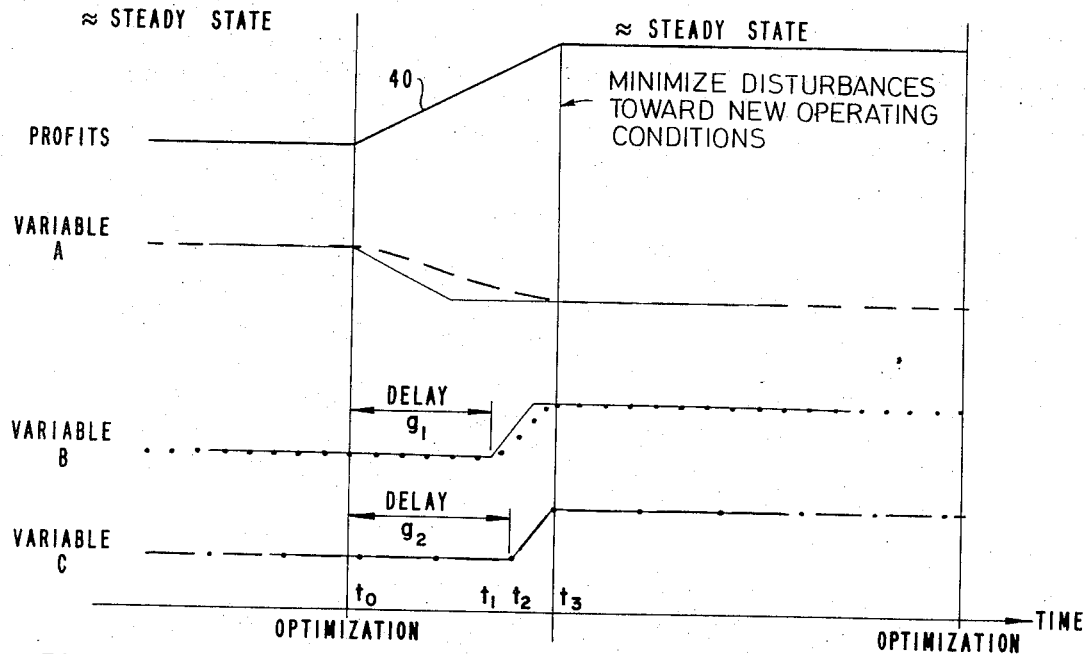
FIG. 5 is a graph showing the sequenced simultaneous variable movement to minimize disturbances at increased profits and for plant dynamics detection.

Clearly it would be better to have profits rise rapidly from the beginning of the variable movement period or at least rise continuously throughout the period. This may be achieved by arranging to have the cancellation effects take place during the latter portion of the variable movement period so that all variables arrive at their final set point at the same time. This means that the least amount of process disturbance occurs toward the end of the period as the process approaches the new operating condition as opposed to having the least amount of disturbance at the beginning when profits are at the lower level. This method of moving the process control variables is illustrated in FIG. 5 where variables $b$ and $c$ have been delayed respectively by time period $g_1$ and $g_2$. The movement of variable $a$, the longest responding variable, is started at time $t_o$, while the movement of variables $b$ and $c$ are started at times $t_1$ and $t_2$ respectively so that all three variables reach their final set point at the same time, $t_3$. This method of movement creates a profit curve 40 taking the form of a ramp which clearly creates more profits than any of the previous methods.

The next step is to reduce the response time of the longest reacting variable, in this case variable $a$. As can be seen from FIGS. 2-5 the control variables are moved from one set point to another along a path that defines a ramp. This is typical of present day practice. However, other variable movement paths are possible and although not novel in themselves, become novel when incorporated in applicant's method. Among the most important of these movements is the step movement as illustrated in FIG. 1 and the time-optimum or bang-bang movement as illustrated by variable $a$ of FIG. 6.

Figure 6:
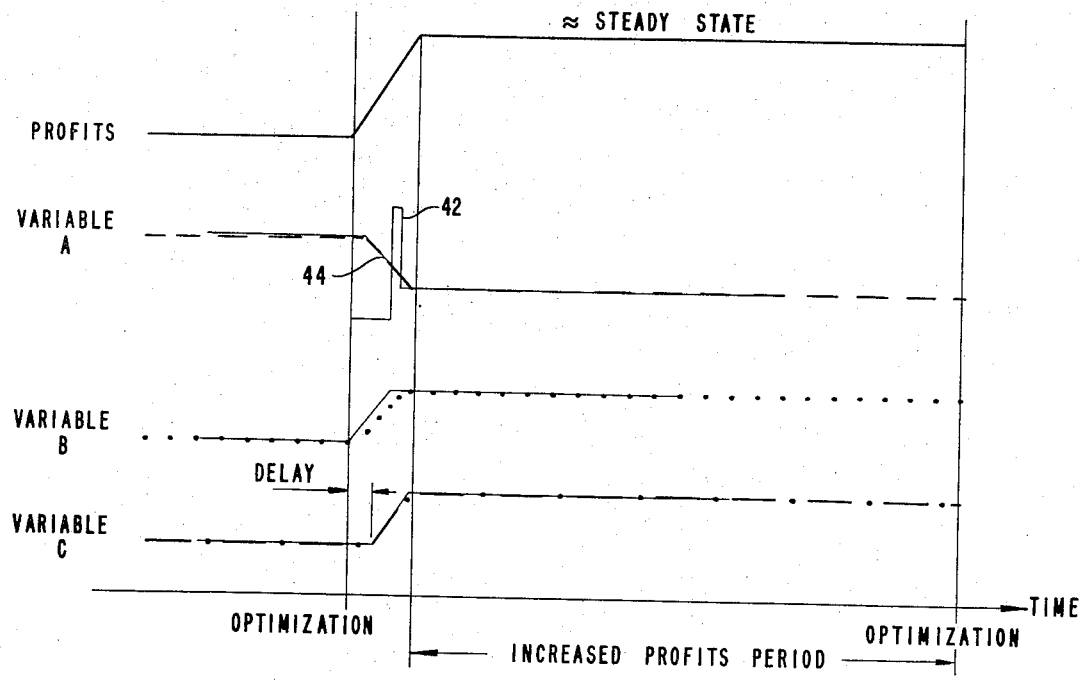
FIG. 6 is a graph showing an improved technique to decrease the longest response time of any particular control variable.

To reduce the response time of the longest reacting variable, a step movement may be used, or if the step movement does not reduce the response time sufficiently, a time optimal movement may be used. In FIG. 6, control variable a represented by curve 42 has been moved in a time optimal fashion to reduce the process response time thereto, illustrated by curve 44, to that of variable b, the next longest reacting variable. This procedure substantially increases profits by greatly reducing the variable movement time. This feature is particularly important since in many chemical processes, the longest reacting variable frequently takes two to three times as long to reach its final set point as the second longest reacting variable. Thus, for processes for which this is true, reducing the reaction time of the longest reacting variable to that of the next longest reacting variable can reduce the total variable movement time by from 50 to 67 percent.

The significance of the present invention also depends on the fact that the process dynamics cannot be determined for all variables with any accuracy. Ideally the dynamics of each variable would be represented by transfer function of the form $$G(s) = [V(s)/M(s)] = [\exp(-aTs)/(Ts+1)(bTs+1)] \quad (1)$$

where $V(s)$ and $M(s)$ are the normalized, transformed process output and control input variables, $T$ is the predominant time constant, $bT$ is the smaller time constant, where $b < 1$, and $aT$ is the transportion lag. If these parameters were known, then the control engineer could calculate the process response to his input whether it be ramp, step, or time optimum and could therefore precisely determine how to shorten the reaction time of the longest reacting process variable. Unfortunately the dynamics of most process variables are continuously changing so that precise control is at present impossible. Consequently the method of the present invention adopts the next best approach.

In order to schedule the delays and the moves of the variables, the time constants and dead time of the plant are estimated. Using these estimations, the response time of the variables and the longest responding variable are identified by calculation.

The longest reacting variable will be moved without delay. The movement of all other variables is delayed so that all responses arrive together at the new operating conditions.

After the execution of the moves, the actual time of arrival of the variables at the new set points is measured. This reveals which variable in fact has the longest response time. This also reveals mistakes in estimation of the dynamics. A better estimate can now be made of the process dynamics.

However, since besides noise in measurement, and interaction between variables, the optimization may require the movement of different combinations of variables, it may be necessary to accumulate plant data over a period of time before an improved estimate of plant dynamics can be made. Assuming that half of the variables are moved by each optimization, perhaps 25 optimizations may be necessary.

Measurement of the variables at one point in time (at new operating conditions) yields only the total effect of time constants and dead time, without further detail. For the short response variables, the total effect is all that is needed. If a short responding variable arrives after the prescribed time, its delay is shortened and vice versa.

The longest responding variable is the bottle neck to the increased profit realization and hence its dynamics warrant more detailed handling. This may be accomplished by recording the moves in the manipulated control variable together with the plant's process variable response. Time constants and dead time may be calculated from these data. With this information the right variable movement may be calculated by Equation 1.

Figure 7:
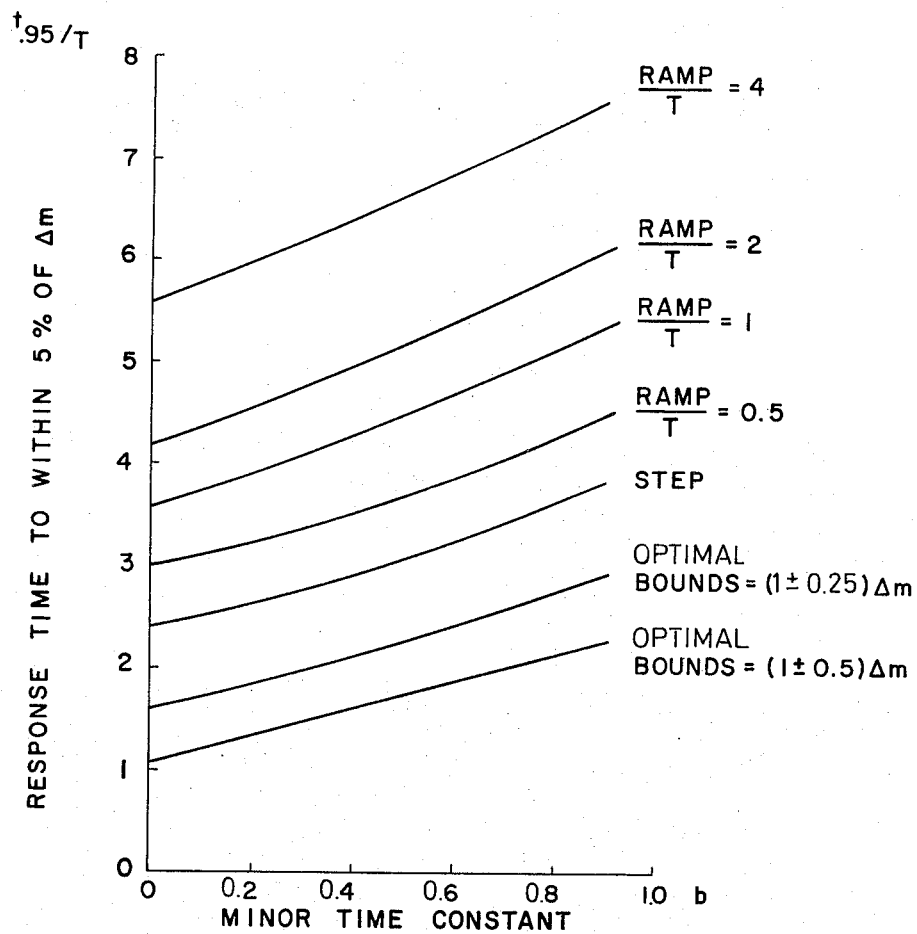
FIG. 7 is a graph showing the response time versus various control variable movements.

FIG. 7 shows the effect of ramp, step, and time optimum variable movements on the response time for second order overdamped processes (this covers most chemical processes). In this Figure, the horizontal scale is the secondary time constant $b$ and the vertical scale is the number of predominant time constants, $T$, necessary to reach 95 percent of final value. The various curves are labeled. The shown movement causing the fastest response is a time-optimum movement with bounds of $(1 \pm 0.5)\Delta m$ where $\Delta m$ is the amplitude of the control variable movement. The slowest movement shown is a ramp covering the desired amplitude in time equal to four time constants, $(t \text{ ramp})/T = 4$.

In predicting the response of a process variable to the movement of a control variable the following analysis is used.

A very large number of industrially controlled chemical processes conform very close to an overdamped second order differential equation with dead time, $a$. In this case the input, $m$, and output $V$ are related, after transformation, by Equation 1. For purposes of analysis it is useful to note that the response of the process defined by equation 1 is the same as a process having no dead time but where the time coordinate is shifted by $aT$.

The response of this process to a step movement is predicted by Equation 2.

$$V(s) = \Delta m\{[1/s(Ts+1)(bTs+1)]\} \quad (2)$$

after transformation to the time domain $$V(t) = \Delta m\{[1-(1/1-b)][\exp(-t/T)-b\exp(-t/bT)]\} \quad (3)$$

Figure 8:
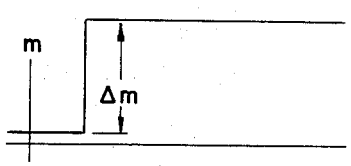
FIG. 8 is a graph of a control variable step movement.
Figure 9:
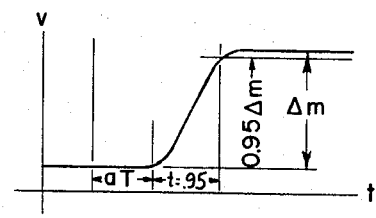
FIG. 9 is a graph of a process variable response to a step movement.

These relationships are illustrated in FIGS. 8 and 9. In predicting the time it will take for the process variable to reach 0.95 of its final value ($0.95\Delta m$), merely set $V(t_{.95}) = 0.95\Delta m$ in Equation 3.

If a ramp movement is used, $$m(t) = (\Delta m/t_r)\, t \quad (4)$$

where $t_r$ is the time duration of the ramp and $\Delta m/t_r$ is the slope of the ramp. After transformation Equation (4) becomes $$m(s) = (\Delta m/t_r)(1/S^2) \quad (5)$$

$$V(S) = m(s)G(s) = (\Delta m/t_r S^2)\cdot[1/(Ts+1)(bTs+1)] \quad (6)$$

Transforming back to the time domain, $$V(t) = \frac{\Delta m}{t_r} \left\{ A + t + \frac{T}{1-b} \left[ \exp(-t/T) - b^2 \exp(-t/bT) \right] \right\} \quad (7)$$

where $$A = \frac{1}{(T+1)(bT+1)} + \frac{T^2}{1-b}\left(\frac{b^3}{bT+1} - \frac{1}{T+1}\right) - 1 \quad (8)$$

Figure 11:
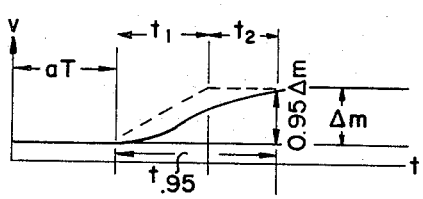
FIG. 11 is a graph of a process variable response to a ramp movement.
Figure 10:
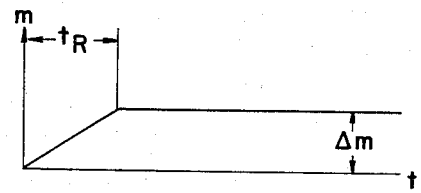
FIG. 10 is a graph of a control variable ramp movement.
Figure 13:
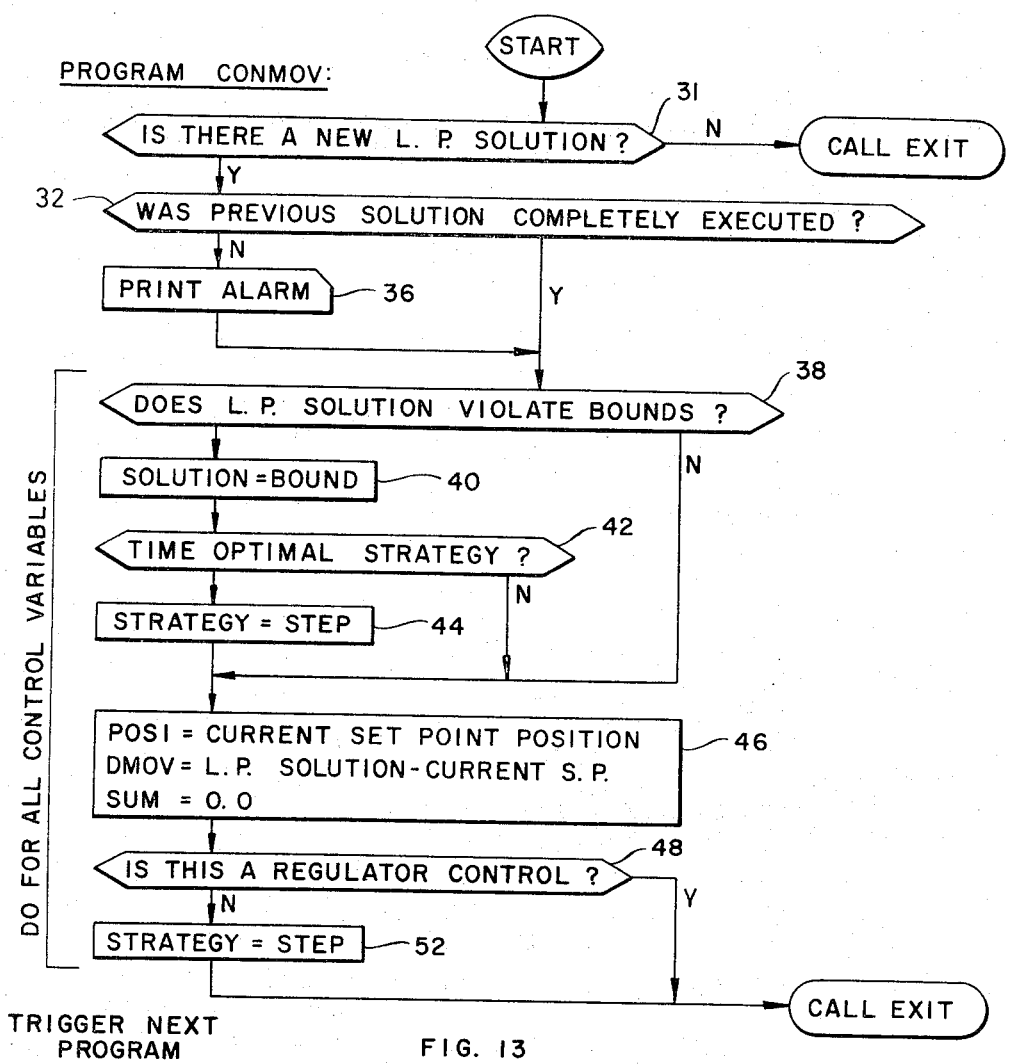
FIGS. 13–15 B are logic flow charts for implementing the invention with the aid of a computer.

The ramp relationships are illustrated by FIGS. 10 and 11. Again $t_{.95}$ may be predicted by substituting $$V(t_{.95}) = 0.95\Delta m \text{ in Equation 7.}$$

Figure 12:
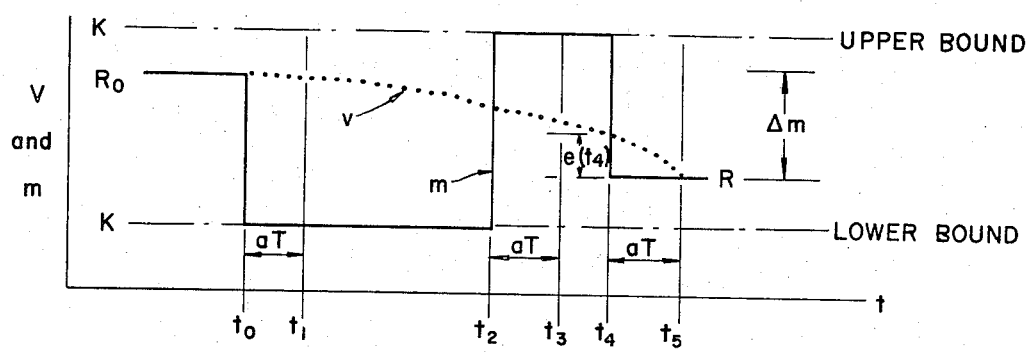
FIG. 12 is a graph of a control variable time optimum movement and the response thereto of the affected process variable.
Figure 14A:
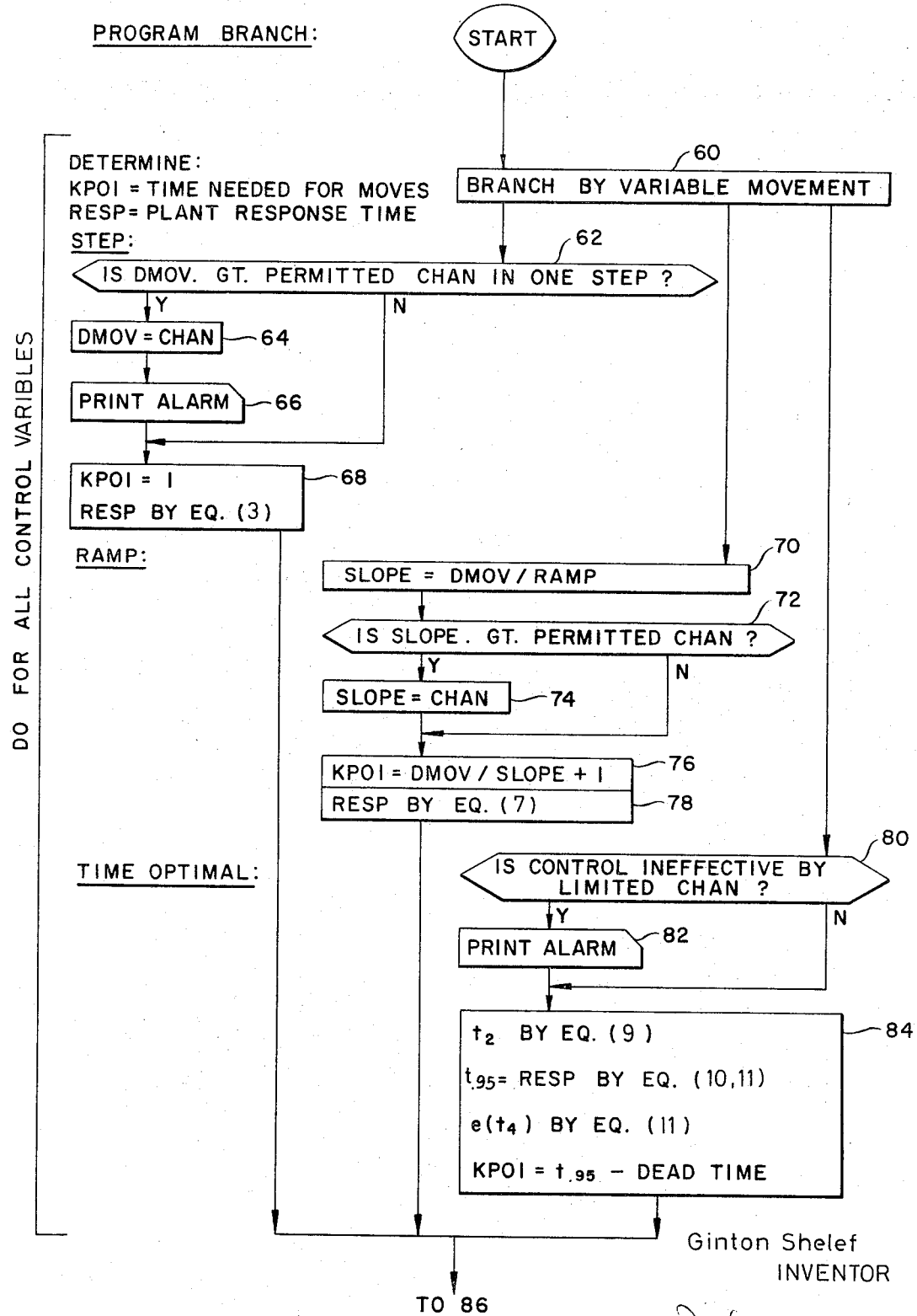
Figures 14, 15:
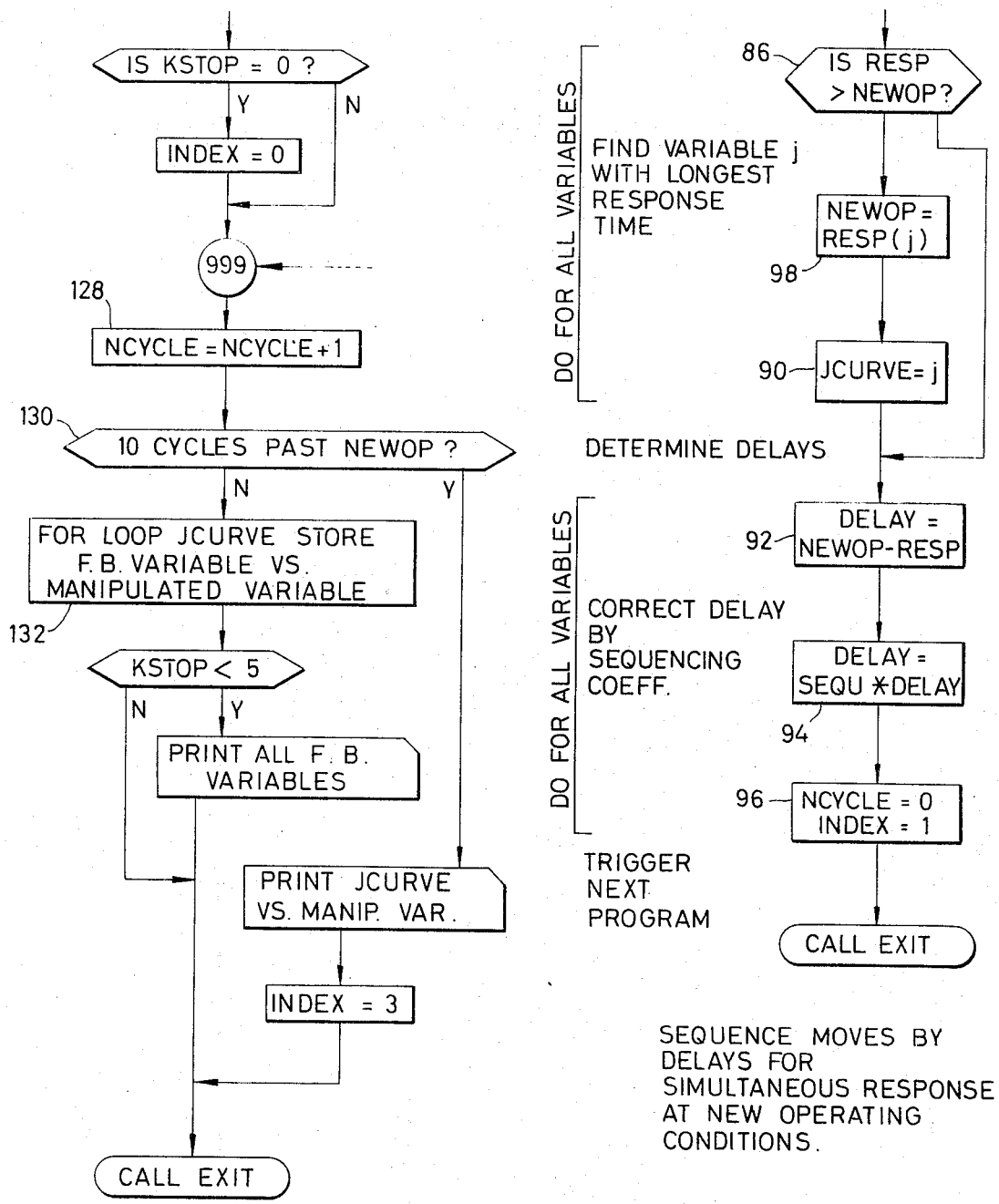

If a time-optimum movement is chosen, the relationships are shown in FIG. 12 where the solid curve represents the input, $m(t)$, the dotted curve represents the output, $V(t)$, and $\Delta m = e_1 = R - R_0$. A complete analysis of this problem may be found in *Time Optimum Control of Second-Order Overdamped Systems with Transportation Lag* by Koppel and Latour, *I and EC Fundamentals*, Vol. 4, No. 4, p. 463 et seq. (Nov. 1965). For the purposes of this invention, however, only part of the analysis is necessary. In FIG. 12, $t_2$ may be computed by $$[(K-K/K-R) + (K-R+e_1/K-R) \exp(-t_2/bT)]^b = (K-K/K-R) + (k-R+e_1/K-R) \exp(-t_2/T) \quad (9)$$

The response time $t_{.95}$ may be computed as follows. For the first part of the trajectory to $t_2$ $$e = (k-R_0/1-b)[\exp(aT-t/T) - b \exp(at-T/bT)] - k + R \quad (10)$$

and for the second part of the trajectory from $t_3$ to the origin are:

$$e = (K - R/1 - b)[\exp(t_{.95} - t/T) - b \exp(t_{.95}-t/bT)] - K + R \quad (11)$$

The logic flow chart for performing the present invention with the aid of a computer is divided into three separate parts merely as a convenience and to accommodate computer memory sizes; otherwise the programs are consecutive. The name of the first program is Conmov.

The purpose of program Conmov is to determine for each of the control variables, its present status and the particular control variable movement chosen by the user.

The first logic step 31 determines whether a new linear programming solution is ready. Next, the step 32 determines whether the previous solution was completely executed. This is necessary since if a ramp movement of a variable is sufficiently long, it may still be moving even though the next *lp* solution is present. If it was not completely executed then an alarm is printed by statement 36.

The next set of logic is done for each control variable. First, statement 38 asks, "Does the *lp* solution violate bounds" where the bounds are the physical constraints of the plant. If it does, then the solution will be on the boundary and this is taken care of by logic statement 40. If it was a time optimal movement that was chosen for this particular control variable, then it is appropriate to perform a step movement which is taken care of by statements 42 and 44. This is true since, it will be recalled that the time optimal movement goes from one bound to another, however, if the variable is already at the bound, a time optimal strategy is identical with step movement and this will be executed even though the user may have specified a time optimal movement. This saves considerable computer computation.

The next set of logic 46 sets the variable POSI, meaning position, equal to the current set point position. The variable DMOV or $\Delta m$ is then equal to the linear program solution minus the current set point. And the variable sum is initialized to zero. The variable sum is used to accumulate the ramp movements to any particular point so that in case of emergency the movement may be immediately completed. Logic statement 48 determines whether the control under investigation is a regulator control loop. If yes, then branch to the end of program Conmov. If it is a regulator control, then the computer moves the variable, for example a valve, without an intermediary. In contrast if it is a non-regulator control, the computer moves a set point station of another controller which in turn pneumatically moves the valve itself. But if there is a set point station, then there is a set procedure to determine all parameters as they should be. The remainder of the program is designed to make those checks.

The Branch program sets up each control loop according to movement. Logic step 60 determines the movement. If the variable movement is a step, then the first logic step, 62, is to determine whether the movement is permitted in one step. Due to safety precautions in any chemical plant, steps or only a limited size are permitted. If the step change is greater than the permitted step size, CHAN, then logic step 64 dictates that DMOV equal CHAN and an alarm 66 is printed. If D move is less than CHAN then the step movement may be made in one, $\Delta t$ where $\Delta t$ is merely an arbitrary time increment, e.g., 15 seconds. The response of the plant to this change is calculated by the equation 3.

If the indicated Branch had been a ramp in logic step 60, then the next logic step 70 would be to determine the slope of the ramp. This is equal to the amplitude of the change divided by the time specified for the ramp, RAMP. Again, if the slope is greater than the permitted change, CHAN, then the slope is adjusted to the permitted change. This is done by logic steps 72 and 74. Functionally step 76 sets variable KPOI equal to the variable DMOV divided by slope plus 1. The response of the plant to this change is determined by Equation 7.

Had the Branch decision in statement 60 been for time optimal, the program would have branched first to statement 80. This decision statement determines whether the control movement by a time optimal movement would be effective or whether the step would be so small, that is limited by CHAN, that it would not be practical to implement a time optimal strategy. If the answer is "yes" then an alarm is printed by statement 82. If the answer is "no" then the program goes directly to functional statement 84 where the appropriate equations are evaluated as indicated.

The logic involved in steps 86–90 is carried out for all variables and is designed to determine the relative response time of the variables so that the appropriate delays may be added to each variable in steps 92 and 94 to cause all variables to arrive at their final set point at the same time. Step 94 multiplies delay by a sequence factor which merely accounts for possibilities when a variable should be delayed either more or less than the calculated delay for particular engineering reasons. Step 96 initializes the counter that determines the number of time intervals, $\Delta t$, taken by the move.

Step 102 of program Execute determines whether the variable under consideration is at that moment in the delay period; that is, being delayed so that it arrives at the final set point with all other variables. If "yes" skip to statement 398, if "no" move on to statement 104 which determines if the move is completed. If the move is completed then go to statement 398, if not move on to statement 106 which determines if the final step of the move is due. Statement 108 determines if the loop is a regulator loop as before. If "yes" then skip to statement 112; if "no" statement 110 determines if the set point station status is advisory, and the process as described previously is repeated. These last moves account for the situation where the operator may change his mind while the computer is moving on a ramp. If this occurs, then the remaining portion of the move is done in a step as indicated by step 111. The remainder of the logic depends on whether the movement chosen by the operator was a ramp, a time optimal or a step. If the strategy were a step, then the program branches to statement 114 where the rest of the move is determined as equal to DMOV minus SUM.

If at statement 112 the Branch is to time optimal, the next question is whether the time has arrived for the switch from one bound to the other. Thus, logic decision block 116 determines whether the variable movement is before, at, or after $t_2$. If it is before $t_2$ then the next decision to be made by decision statement 18 is whether it is at the end of the delay. If it is at $t_2$ the switching movement to the opposite bound is carried out by functional statement 120. If it is after $t_2$, then it may be necessary to go to the final control variable value at $t_4$. This logic and function are carried by statements 122 and 114. Functional statements 126 and 128 determine if the preceding logic has been carried out for all variables. If the logic has been completed for all variables, this is noted by setting index to zero and the variable Ncycle up-dated by functional statement 128.

At this point the response of all variables is printed from a time KSTOP equal 5 to five time constants, $\Delta t$, before the expected arrival time of all variables to the new operating conditions, NEWOP plus 10 cycles. This prints over roughly 15 cycles and insures the operator of the ability to determine whether each process variable arrived before or after its estimated arrival time.

Finally, a printout of the longest reacting variable is made to serve as a basis for predicting its dynamics. Statement 130 determines whether we are ten cycles past NEWOP. If so then JCURVE is printed and the program is complete. If the program is not 10 cycles past NEWOP, then functional statement 132 dictates that the process variable JCURVE versus its control variable be stored. The final step is to determine if KSTOP-5 has been reached. If so then print all process variables and the program is finished. If not, fall through and repeat the program.

I claim as my invention:

1. In a method of controlling a multivariable process, the steps comprising:
    estimating the total response time of all process variables;
    delaying each control variable by an appropriate delay time so that each of said process variables reach their final set point at the same predetermined time;
    measuring the response time of each process variable with respect to said predetermined time;
    adjusting said delay time for each control variable when the corresponding process variable reaches its final set point at some actual point in time and the difference between said actual point in time and said predetermined point in time is greater than a predetermined value, said adjustment being in a direction to reduce said time difference.

2. The method of claim 1 further characterized by the steps of:
    estimating the dynamic characteristics of the longest reacting process variable; and
    manipulating the appropriate control variables such that the total reaction time of said longest reacting process variable is no longer than the reaction time of the second longest reacting process variable.

3. The method of claim 2 wherein the manipulation of said control variables is achieved in the following manner;
    determining the response time of said longest reacting process variable to ramp movements, step movements, and time optimal movements in the corresponding control variable; and,
    changing the set point of said corresponding control variable by the movement that reduces the response time of said longest reacting process variable to no more than the response time of said second longest reacting process control variable.

* * * * *